(12) United States Patent
Court et al.

(10) Patent No.: US 7,888,831 B2
(45) Date of Patent: Feb. 15, 2011

(54) ROTOR STRUCTURES FOR MOTOR

(75) Inventors: Andrew Lee Court, Coventry (GB); Jeffrey Ronald Coles, Solihull (GB)

(73) Assignee: TRW Limited (GB)

( * ) Notice: Subject to any disclaimer, the term of this patent is extended or adjusted under 35 U.S.C. 154(b) by 20 days.

(21) Appl. No.: 12/296,959

(22) PCT Filed: Apr. 13, 2007

(86) PCT No.: PCT/GB2007/001383

§ 371 (c)(1),
(2), (4) Date: Aug. 21, 2009

(87) PCT Pub. No.: WO2007/122391

PCT Pub. Date: Nov. 1, 2007

(65) Prior Publication Data

US 2009/0302718 A1    Dec. 10, 2009

(30) Foreign Application Priority Data

Apr. 13, 2006    (GB) .................................. 0607425.6

(51) Int. Cl.
*H02K 11/00* (2006.01)
*G01D 5/12* (2006.01)
(52) U.S. Cl. ..................... 310/68 B; 310/261.1; 341/15
(58) Field of Classification Search ............... 310/68 B; 250/231.13, 231.18; 341/15; 377/17
See application file for complete search history.

(56) References Cited

U.S. PATENT DOCUMENTS

| | | | | |
|---|---|---|---|---|
| 4,386,270 A | * | 5/1983 | Ezekiel ................. | 250/231.13 |
| 4,773,381 A | * | 9/1988 | Koshida ................ | 123/630 |
| 4,841,297 A | * | 6/1989 | Bourgeaux et al. | |
| 4,932,388 A | * | 6/1990 | Chiba et al. ............ | 123/613 |
| 5,057,684 A | * | 10/1991 | Service ................. | 250/231.13 |
| 5,155,401 A | * | 10/1992 | Kanaya et al. ............ | 310/89 |
| 5,407,294 A | * | 4/1995 | Giannini ................ | 403/337 |
| 5,549,091 A | * | 8/1996 | Tsunoda et al. .......... | 123/476 |
| 5,786,646 A | * | 7/1998 | Newberg et al. ......... | 310/68 B |
| 6,107,621 A | * | 8/2000 | Imai et al. | |
| 6,194,849 B1 | | 2/2001 | Wilson-Jones et al. | |
| 6,211,631 B1 | | 4/2001 | Wilson-Jones et al. | |
| 6,504,146 B1 | * | 1/2003 | Sakai et al. ............ | 250/231.13 |

(Continued)

FOREIGN PATENT DOCUMENTS

DE    103 33 092 A1    3/2004

(Continued)

Primary Examiner—Burton Mullins
(74) Attorney, Agent, or Firm—MacMillan, Sobanski & Todd, LLC

(57) ABSTRACT

A rotor structure for a motor comprising a rotor having an end surface; a shaft extending from the end surface; an encoder member attached to the end surface of the rotor; and a coupler coupled to the shaft adjacent to the encoder member for coupling a further member to the shaft, in which the coupler surrounds the shaft and has a lip associated therewith, the lip extending from the coupler towards the encoder member so as to define a void between the coupler and the encoder member. The void defined by the rotor structure may act to contain matters such as swarf that is ejected from the rotor when the encoder member is fixed to the rotor. The rotor may be used in a motor of an electric power assisted steering (EPAS) system.

19 Claims, 2 Drawing Sheets

U.S. PATENT DOCUMENTS

| | | |
|---|---|---|
| RE38,178 E | 7/2003 | Elsässer et al. |
| 6,857,981 B2 | 2/2005 | Hori et al. |
| 7,026,734 B2 * | 4/2006 | Braun ...................... 310/68 B |
| 7,060,969 B2 * | 6/2006 | Uchiyama et al. ...... 250/231.16 |
| 2007/0034787 A1 * | 2/2007 | Mutschler et al. ...... 250/231.13 |
| 2007/0096018 A1 * | 5/2007 | Yoshioka ............... 250/231.13 |

FOREIGN PATENT DOCUMENTS

| | | |
|---|---|---|
| EP | 0 650 246 B1 | 11/2001 |
| EP | 1681757 A1 | 7/2006 |
| JP | 6-194185 * | 7/1994 |
| JP | 8331824 A | 12/1996 |
| WO | WO 98/10971 | 3/1998 |

\* cited by examiner

ROTOR STRUCTURES FOR MOTOR

CROSS-REFERENCE TO RELATED APPLICATIONS

This application claims priority to International Patent Application No. PCT/GB2007/001383 filed Apr. 13, 2007, the disclosures of which are incorporated herein by reference in their entirety, and which claimed priority to Great Britain Patent Application No. 0607425.6 filed Apr. 13, 2006, the disclosures of which are incorporated herein by reference in their entirety.

BACKGROUND OF THE INVENTION

This invention relates to rotor structures for motors, a motor using such a rotor and an electric power assisted steering system using such a motor.

Electric Power Assisted Steering (EPAS) systems are well known in the prior art. They typically comprise an electric motor having a stator and a rotor, an input shaft operatively connected to the rotor and adapted to rotate therewith, an output shaft associated with a steering column, and a gearbox adapted to transfer torque from the input shaft to the output shaft in response to a measure of torque in the output shaft produced by a torque sensor. The motor is typically operated to apply an increasing torque to the output shaft as the measured torque increases, thus applying an assistance torque which helps to steer the vehicle. Such a system is disclosed in PCT Patent Application publication number WO99/65758.

It is desirable to be able to determine the angular position of the rotor of the motor of such a system. Typically, this is achieved by having an encoder member such as a disc fixed by means of rivets or other such fastenings to the rotor. The encoder member carries a pattern encoding angular position, such as a magnetic or optical pattern. A sensor fixed relative to the motor can then sense the pattern and from that determine the position of the rotor.

BRIEF SUMMARY OF THE INVENTION

According to a first aspect of the invention, there is provided a rotor structure for a motor comprising:
  a rotor having an end surface;
  a shaft extending from the end surface;
  an encoder member attached to the end surface of the rotor; and
  a coupler coupled to the shaft adjacent to the encoder member for coupling a further member to the shaft,
  in which the coupler surrounds the shaft and has a lip associated therewith, the lip extending from the coupler towards the encoder member so as to define a void between the coupler and the encoder member.

In the prior art, problems arise with the fixing of the planar encoder member on the rotor. The use of fixing means (such as rivets) that displace material of the rotor as they are inserted can lead to unwanted material being emitted from the rotor. As the body of the rotor is frequently magnetic, the ejected material will most likely be also. This can be attracted to the encoder member where a magnetic encoder member is use, hence degrading the accuracy or reliability of the measurement of rotor position.

Furthermore, if permanent magnets are used in the motor, such as in a permanent magnet rotor, the ejected material could be attracted to those magnets. This may lead to the ejected material becoming lodged between the stator and rotor of the motor, leading to a possible seizure of the motor. This is most undesirable.

The void defined by the rotor structure of the invention preferably acts to contain any matter that might be ejected from the rotor when the encoder member is fixed to the rotor. Such matter may include swarf or the like.

The rotor structure of the present invention is particularly useful where the encoder member is fitted to the rotor by means of an interference fitting such as one or more rivets. However, it is equally applicable if screws were to be used, or any other fixing whereby on fixing material is displaced from the rotor.

Typically, the encoder member is a planar member such as a disc. The encoder member may form part of an angular position sensor for sensing the angular position of the rotor. The invention is particularly useful where the encoder member forms part of a magnetic encoder member or disc; material which otherwise might be attracted to the magnetically-encoded member may be trapped in the void.

Where the encoder member is a disc, it is typically mounted coaxially with the shaft. Furthermore, it is typically mounted in a plane substantially perpendicular to the shaft. In such a case, the void may be defined between the coupler, the lip, the encoder member and the shaft (or a member surrounding the shaft at the void). Accordingly, the void may be an annular void.

The lip may extend to touch the encoder member. However, in a preferred embodiment the lip extends to, but does not touch, the encoder member. The gap between the encoder member and the lip may be less than 10%, or 5%, or 1% of the thickness (in the direction along the shaft) of the lip. It may be smaller than the size of any ejected matter that the void is to contain. Accordingly, if the encoder member moves relative to the rotor, for example due to a gradual working-loose of the fixing of the encoder member over time, the lip will prevent the encoder member moving away from the end face of the rotor.

Such undesirable movement could lead to incorrect or unreliable measurements of position as the distance of the encoder member from the sensor could vary outside tolerable limits. The lip may therefore prevent the encoder member moving out of correct registration. Erroneous position measurements may therefore be reduced.

The encoder member may have a first face positioned against the end face of the rotor and a second face facing away from the end face of the rotor. Additionally, the encoder member may comprise one or more encoding elements circumferentially spaced around its second face. In such a case, a radially inner edge of the encoding elements may define a circumferential step extending around the encoder member. The lip may be positioned radially inward from the step, preferentially immediately, or substantially immediately, so. The juxtaposition of the lip and the step may act to more reliable trap undesirable matter in the void.

The rotor may be a permanent magnet rotor. This makes the trapping of extraneous matter even more desirable, as otherwise such matter might be attracted to the permanent magnets, and possibly become trapped between rotor and stator in use. This could lead to motor seizure.

According to a second aspect of the invention, there is provided a motor comprising a stator and a rotor structure according to the first aspect of the invention. The motor may be a permanent magnet motor. The motor may comprise a rotor position sensor, comprises a sensor for a pattern on the encoder member.

According to a third aspect of the invention, there is provided an Electric Power Assisted Steering (EPAS) system comprising a motor according to the second aspect of the invention operatively coupled to the steering mechanism of a vehicle. Typically, the coupler of the rotor structure may be coupled to a worm gear of a gearbox coupled to a steering shaft.

Other advantages of this invention will become apparent to those skilled in the art from the following detailed description of the preferred embodiment, when read in light of the accompanying drawings.

DETAILED DESCRIPTION OF THE INVENTION

Figure 1:
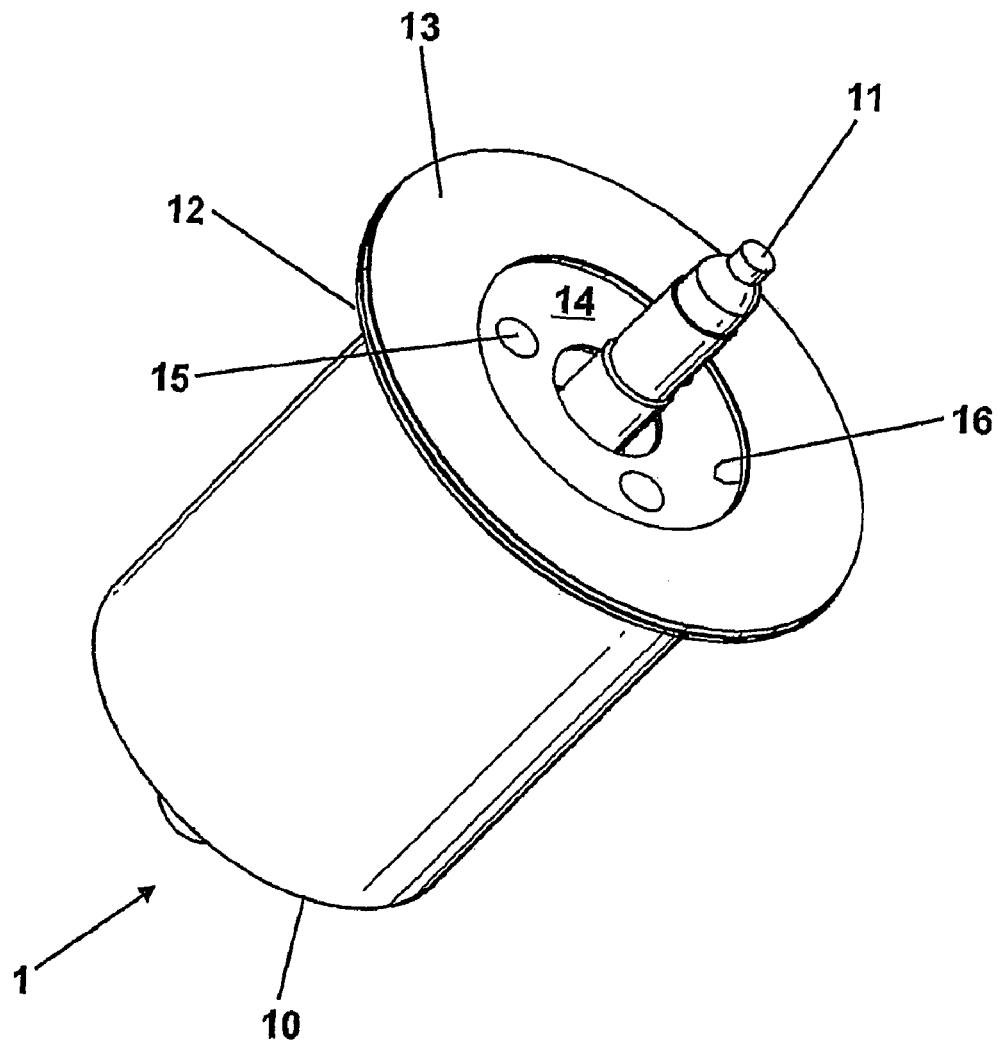
FIG. 1 shows a perspective view of the rotor structure of an embodiment of the present invention, with the coupler removed.
Figure 2:
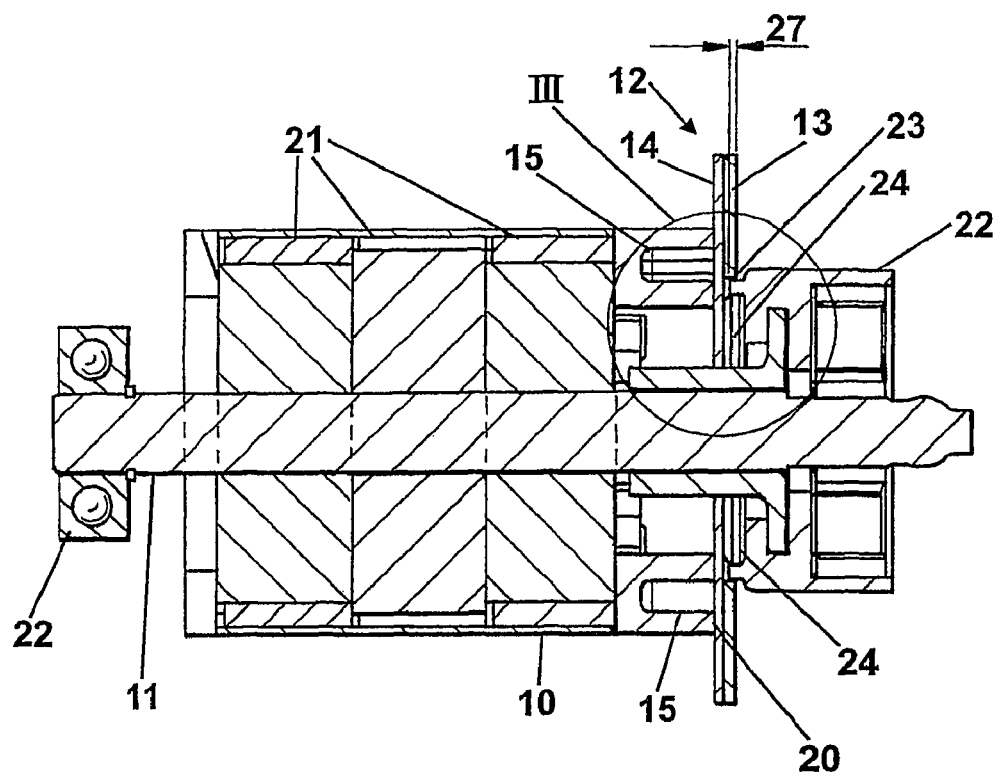
FIG. 2 shows a cross section through the rotor structure of FIG. 1, with the coupler fitted.

A rotor structure 1 according to an embodiment of the invention is shown in the accompanying drawings. The rotor structure 1 comprises a rotor 10 with a shaft 11 attached and passing through end face 20 of the rotor 10. The rotor typically is a permanent magnet rotor comprising a plurality of permanent magnets 21, which would be free to rotate within a wound stator (not shown) of a motor. Application of current to coils of the stator in a given order attracts the permanent magnets 21 and hence causes rotation of the rotor 10 and hence the rotor structure 1. The shaft is typically supported by bearings 22 to aid rotation.

Attached to the end face of rotor 10 is a disc-shaped encoder member 12. This comprises a back iron 14 of disc form. The back iron 14 supports, on the face facing away from end face 20 of rotor 10, magnetic encoding elements (depicted at 13). The back iron 14 is secured to the rotor 10 by means of rivets 15. These are an interference fit within rotor 10.

The encoding elements 13 encode the rotation position of the rotor 10 in use by providing a known magnetic field pattern, typically by providing a pattern of north and south poles circumferentially around the encoder member 12. As such, the encoding elements 13 have a slight thickness and so define a circumferential step 16 around their radially inner edges.

A coupler 22 is provided over the portion of shaft 11 that extends from the rotor 10, on the side of the encoder member 12 facing away from the rotor and fixed to the shaft. This can couple the rotor structure 1 to whatever device the motor is to power; this may be an electric power assisted steering system. An example of such a system is disclosed in the PCT Patent Application published as WO99/65758; the coupler 22 could be coupled to the worm gear of the gearbox of that device.

The coupler comprises a lip 23 which depends from the coupler towards the encoder member. It defines an annular void 24 in which matter ejected from the rotor 10 due to insertion of rivets 15 can be contained. As discussed above, this feature stops the escape of such material and hence may prevent that material escaping and interfering with either the encoder member or the rotation of the rotor relative to the stator.

Figure 3:
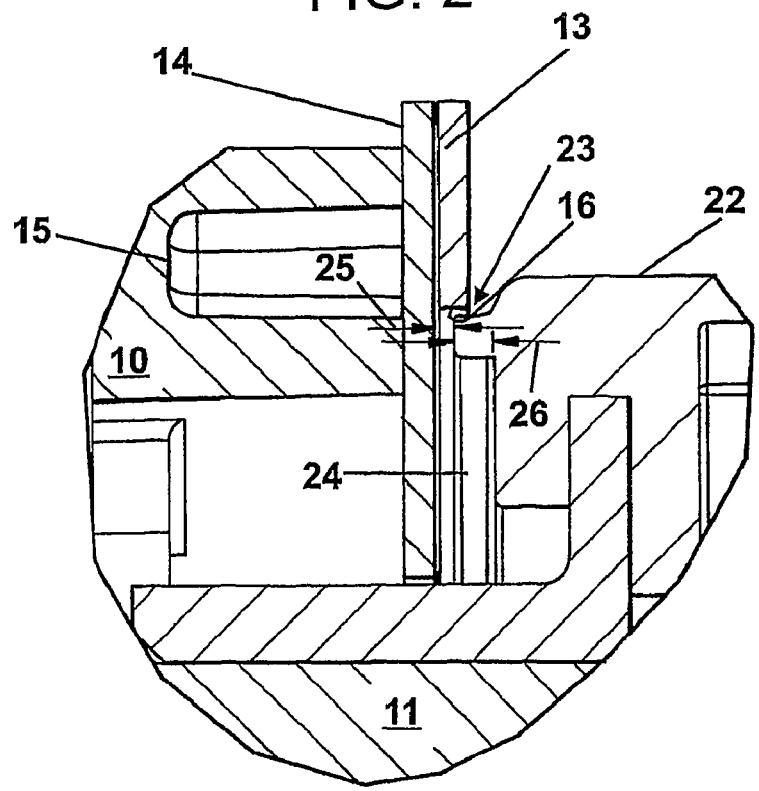
FIG. 3 shows an enlargement of the area depicted as "III" in FIG. 2.

As can be seen in FIG. 3, the lip 23 is positioned adjacent to the step 16. The juxtaposition of the lip 23 and the step 16 acts to secure the annular void 24 against escape of unwanted material.

There is typically only a small gap 25 between the lip 23 and the back iron 14. The gap is typically much smaller than the width 26 of the lip 23 or the width 27 of the step 16. This "almost" or "lightly" touching contact of the lip with the encoder member 12 may prevent or reduce the effect of the encoder member working loose from the rotor.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. A rotor structure for a motor comprising:
a rotor having an end surface;
a shaft extending from the end surface;
an encoder member attached to the end surface of the rotor; and
a coupler coupled to the shaft adjacent to the encoder member for coupling a further member to the shaft, the coupler surrounding the shaft and having a lip associated therewith, the coupler lip extending from the coupler towards the encoder member so as to define a void between the coupler and the encoder member.

2. The rotor structure of claim 1 wherein the void acts to contain any matter that might be ejected from the rotor when the encoder member is fixed to the rotor.

3. The rotor structure of claim 1 wherein the encoder member forms part of an angular position sensor for sensing the angular position of the rotor.

4. The rotor structure of claim 3 wherein the encoder member is a magnetic encoder member.

5. The rotor structure of claim 1 wherein the encoder member is a disc mounted coaxially with the shaft.

6. The rotor structure of claim 5 wherein the void is defined between the coupler, the coupler lip, the encoder member and the shaft.

7. The rotor structure of claim 1 wherein the void is an annular void.

8. The rotor structure of claim 7 wherein the lip extends to touch the encoder member.

9. The rotor structure of claim 7 wherein the lip extends to, but does not touch, the encoder member, thus defining a gap.

10. The rotor structure of claim 9 wherein the coupler lip has a thickness and the gap between the encoder member and the coupler lip is less than 10% of the thickness of the coupler lip.

11. The rotor structure of claim 9 wherein the gap is smaller than the size of any ejected matter that the void is to contain.

12. The rotor structure of claim 1 wherein the encoder member has a first face positioned against the end face of the rotor and a second face facing away from the end face of the rotor, the encoder member comprising at least one encoding element circumferentially spaced around its second face wherein a radially inner edge of the at least one encoding element defines a circumferential step extending around the encoder member.

13. The rotor structure of claim 12 wherein the coupler lip is positioned at one of immediately and substantially immediately radially inward from the circumferential step.

14. The rotor structure of claim 1 wherein the rotor is a permanent magnet rotor.

15. A motor comprising:

a stator; and a rotor structure, the rotor structure including:

a rotor having an end surface;

a shaft extending from the end surface;

an encoder member attached to the end surface of the rotor; and a coupler coupled to the shaft adjacent to the encoder member for coupling a further member to the shaft with the coupler surrounding the shaft and having a lip associated therewith, the coupler lip extending from the coupler towards the encoder member so as to define a void between the coupler and the encoder member.

16. An Electric Power Assisted Steering (EPAS) system comprising:

a motor having a stator and a rotor structure, the rotor structure including:

a rotor having an end surface;

a shaft extending from the end surface;

an encoder member attached to the end surface of the rotor; and a coupler coupled to the shaft adjacent to the encoder member for coupling a further member to the shaft, with the coupler surrounding the shaft and having a lip associated therewith, the coupler lip extending from the coupler towards the encoder member so as to define a void between the coupler and the encoder member; and a steering mechanism of a vehicle, the steering mechanism being operatively coupled to the motor.

17. The rotor structure of claim 5 wherein the void is defined between the coupler, the coupler lip, and a member surrounding the shaft at the void.

18. The rotor structure of claim 9 wherein the coupler lip has a thickness and the gap between the encoder member and the coupler lip is less than 5% of the thickness of the coupler lip.

19. The rotor structure of claim 9 wherein the coupler lip has a thickness and the gap between the encoder member and the coupler lip is less than 1% of the thickness of the coupler lip.

* * * * *